Figures 1, 6:
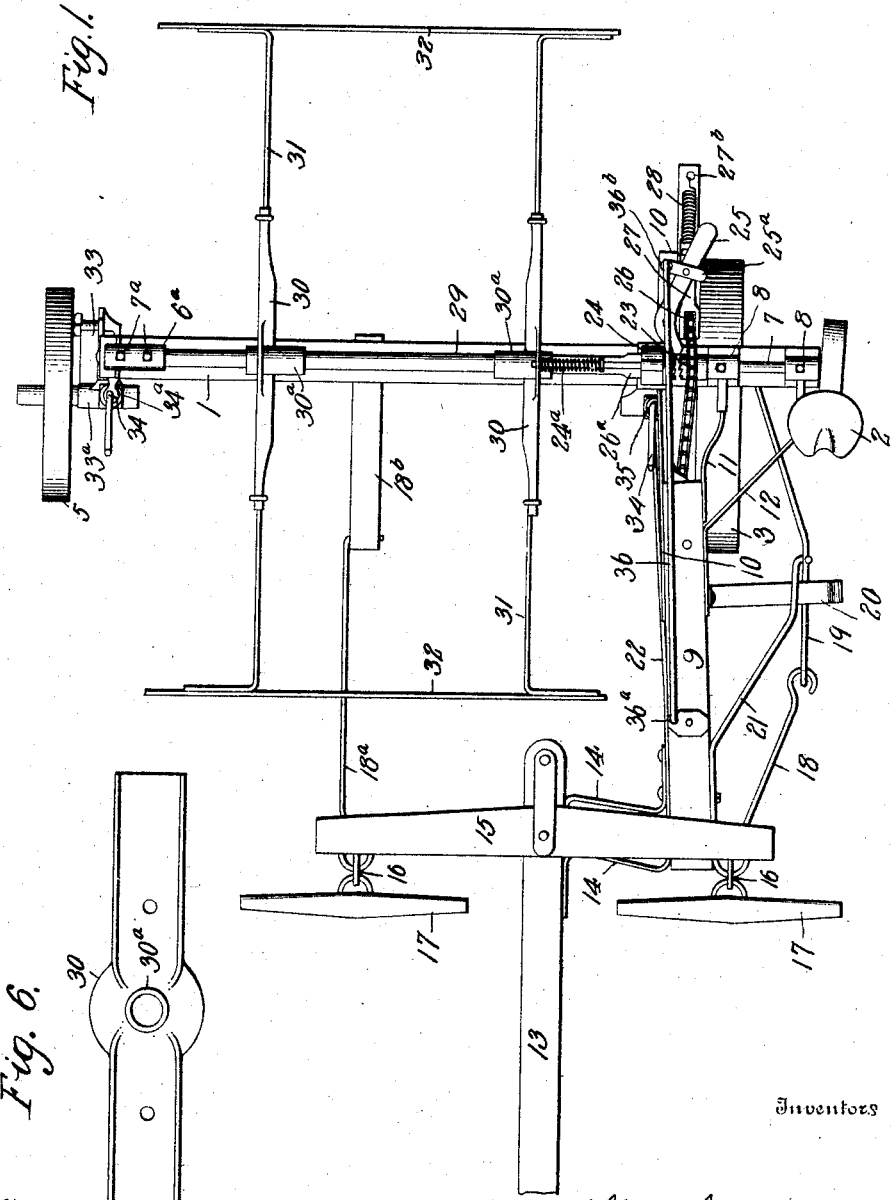

A. CANUTESON & J. J. RINGNESS.
STALK CHOPPER.
APPLICATION FILED MAY 18, 1907.

907,221.

Patented Dec. 22, 1908.
2 SHEETS—SHEET 1.

Witnesses
Jos. F. Collins
W. A. Redmond

Inventors
Alfred Canuteson
John J. Ringness
By J. F. Beale
Attorney

THE NORRIS PETERS CO., WASHINGTON, D. C.

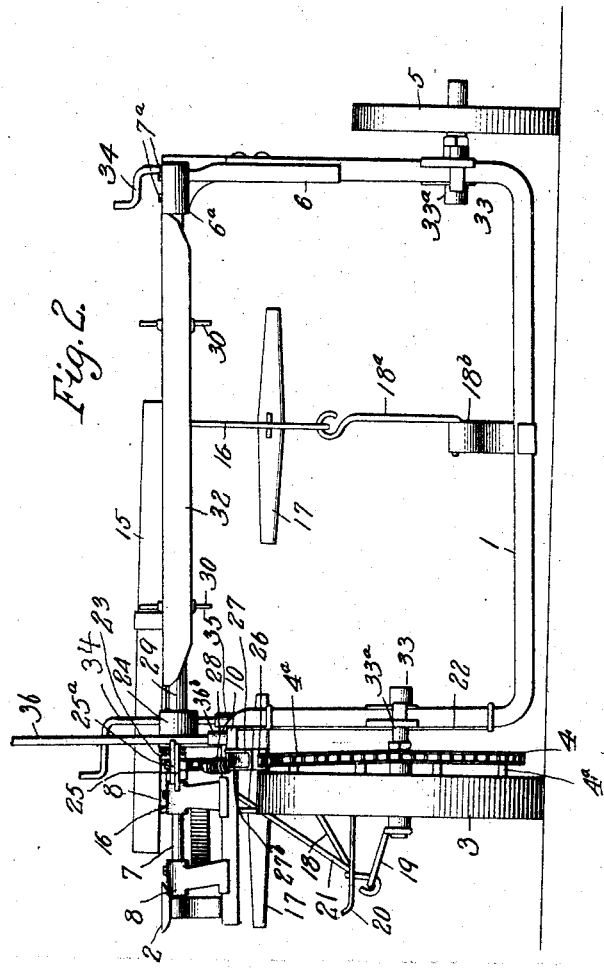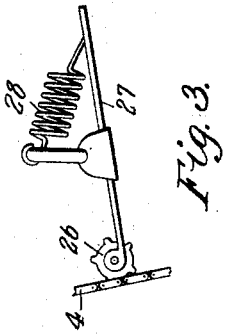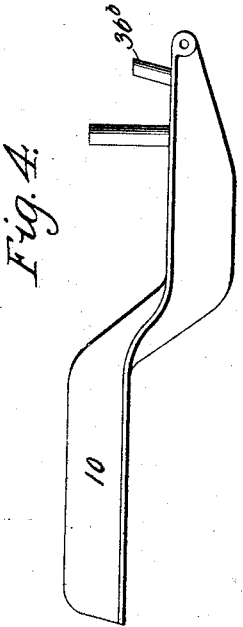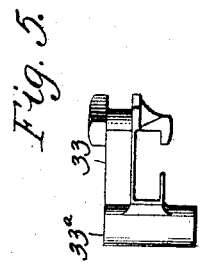

UNITED STATES PATENT OFFICE.

ALFRED CANUTESON AND JOHN J. RINGNESS, OF NORSE, TEXAS.

STALK-CHOPPER.

No. 907,221.  Specification of Letters Patent.  Patented Dec. 22, 1908.

Application filed May 18, 1907. Serial No. 374,427.

*To all whom it may concern:*

Be it known that we, ALFRED CANUTESON and JOHN J. RINGNESS, citizens of the United States, residing at Norse, in the county of Bosque and State of Texas, have invented certain new and useful Improvements in Stalk-Choppers, of which the following is a specification.

Our invention relates to stalk choppers and more particularly to that class of stalk choppers designed for breaking cotton and corn stalks.

The object of our invention is to provide a machine of this character which will effectually break cotton and corn stalks in two rows at a time; the construction and arrangement of the several parts enabling the horses to straddle the first of the two rows of stalks being broken, and afford the driver full view of the two rows of stalks.

It is also our object, in a two wheel machine having a side draft, to equalize the draft upon the main frame; to mount the two wheels in alinement one with the other and at right angles to the line of draft.

It is also our object to provide a strong and rigid main frame made in one piece and adapted to afford support for all attachments forming the machine and also to supply the place of a breaker bar.

Other advantages of our invention will appear hereinafter.

In the accompanying drawings forming a part of this specification: Figure 1 is a top plan view of our stalk chopper, and Fig. 2 is a rear elevation of the same. Fig. 3 is a detail view of the tension device for sprocket chain. Fig. 4 is a detail view of a casting for connecting the outrigger, which supports the tongue, to the main frame, said casting also affording a support for the tension device for sprocket chain, and other parts in rear of main frame. Fig. 5 is a top plan view of casting having journals for driving and caster wheels. Fig. 6 is a detail of castings for mounting reel arms to reel shaft.

Referring more particularly to the drawings 1 denotes the main frame made of a flat metal bar in one piece and extends from side to side of the machine. Bolted to the extreme left side of the frame is the driver's seat 2. Said frame passes thence over the drive wheel 3 and sprocket wheel 4, clearing these wheels the frame turns at a right angle passing down close to the sprocket wheel and slightly below it where it turns to the right at a right angle crossing under the reel thus forming the breaker bar when it again turns at a right angle upward and serves as a support for caster wheel 5 and also for a casting 6 to which it is rigidly bolted. Casting 6 is surmounted by a bearing $6^a$ cast integral.

7 denotes a tie rod bolted in bearing $6^a$ by set screws $7^a$. The tie rod extends from said bearing across to the opposite side of the machine where it is bolted in like manner to bearings 8, 8, which bearings are rigidly bolted to the main frame.

9 denotes an outrigger to the main frame projecting forward of said frame being secured thereto by a casting 10 bolted to the side and bottom of said outrigger and bolted to the main frame on both sides of the adjacent angle. 11, and 12 denote side braces for said outrigger secured to lugs formed on bearings 8, 8. 13 denotes the tongue secured upon the right side of said outrigger by two Z-shaped offsets 14.

15 denotes an evener secured to the tongue and is provided with depending links 16 at each end. Said links are provided with several perforations for adjustable attachment of swingletrees 17. At the lower ends of each link are provided draft rods 18, $18^a$, the former extending rearwardly and linked or hooked into a rod 19 passing rearward and fastened to the projecting end of axle of driving wheel. The draft rod $18^a$ passes rearward and is fastened to a flat curved bar $18^b$ bolted to the under side of the breaker bar or main frame. The outrigger 9 is projected in front sufficiently to cause the tongue and evener to clear the reel and the tongue is set sufficiently to one side of the outrigger by the Z-shaped offsets to centralize the draft through said draft rods upon the main frame.

20 denotes a step for the driver secured to the outrigger 9 and braced by rod 21 the end of said rod being bent to form a guide or support for draft rod 19. Upon the right side of outrigger 9 is secured a brace rod 22 which passes rearward and downward and is fastened to left hand side of main frame.

The sprocket wheel is provided on one side with sockets open at each end and the driving wheel has like sockets on its spokes which register with the sprocket sockets. Threaded bolts $4^a$ passing through both sets of sockets serve to fasten said wheels together. The sprocket chain passes over a small sprocket or spur 23 which revolves on tie rod 7. Said spur has a clutch member which registers with a clutch member on a sliding casting 24. 24ª denotes a spring actuated rod holding said clutch members engaged; said rod having one end bearing in a socket formed in casting 24, its opposite end bearing on a casting on the reel hereinafter named.

25 denotes a lever one end of which bears on a flange on casting 24. Said lever is pivotally mounted on a post near the rear end of casting 10 and serves to throw said clutch members out of engagement.

25ª denotes a short arm pivoted to said lever which locks into a rear arm of driver's guard hereinafter described and serves to hold said lever in engagement with said flange while pressing the casting 24 back thus holding its clutch member out of engagement with the clutch member on spur 23.

26 denotes an idler bearing upon the sprocket chain. 27 an arm pivoted to casting 10 to which said idler is mounted.

28 denotes a coiled spring adjustably fastened to the rear end of arm 27 by means of perforations 27ᵇ in the end of said arm. Said spring serves to govern the tension of said idler upon the sprocket chain.

29 denotes a hollow shaft mounted to revolve upon tie rod 7 and provided at its left end with key ways 26ª on which casting 24 slides.

30 denote two reel arm-holders cast with bearings 30ª midway of their length and formed with flanged sides and bolt holes.

31 denote reel arms formed or cast with bent or flanged ends to which are bolted blades or breakers 32. Thus the reel is formed of the hollow shaft 29 having keyed or bolted rigidly thereto the holders 30 to which are bolted arms 31, and to which arms are secured the breakers 32.

33 denote castings provided with journals 33ª for the driving and caster wheels and formed with a rectangular recess adapted to span and ride upon the front sides of the main frame. Said castings bear upon the sides of main frame and are provided with threaded sockets having L-shaped clamping bolts headed at their outer ends.

34 denote stay rods at each side of the main frame which are threaded and register with internally threaded lugs 34ª and 35 the former being cast integral with casting 6 and the latter formed integral with casting 10. Thus the main frame is afforded a vertical adjustment upon the driving and caster wheels and the stay rods serve to hold said castings in position.

36 denotes a guard or fender fastened into sockets 36ª, 36ᵇ the former being on the outrigger and the latter on the rear extension of casting 10. The rear arm of this fender serves as a rest for lever 25 when holding sliding clutch on casting 24 back out of engagement with the clutch on spur 23. The purpose of said fender is to protect the driver from the reel.

By our construction the main frame is arranged at right angles to the line of draft and affords not only a support for the reel but that portion under the reel is made to serve as a breaker bar. The upright portion of said frame besides serving as a reel support also affords means for attaching the driving and caster wheels while the extension of said frame on the left serves both as a support for the driver's seat and as a base for attachment, through an outrigger, of the tongue. Said frame being in one piece and its upper ends braced by the tie rod is strong and rigid yet of light weight.

The attachment of the tongue to one side of the main frame by means of the outrigger and offset and projecting the pole out from the top of the machine allows the pole to pass over the tops of the first row of stalks without striking or displacing them, while the team straddles this row. The adjoining row is chopped down at the same time the reel being wide enough to embrace two rows. It is evident the draft rods attached to the evener and their connecting rods equalize the draft upon the driving wheel and breaker bar.

The reel structure is made especially strong by the hollow shaft and arrangement of flat steel arms arranged edgewise to the direction of strain and presenting a narrow surface to air resistance is also a desirable feature. The means for adjustably mounting the main frame to the driving and caster wheels is another important advantage gained by our construction.

Having thus shown and described our invention what we claim and desire to secure by Letters Patent is:

1. In a stalk chopping machine having a draft appliance and a reel and breaker bar arranged to one side thereof, the combination of the main frame extending from side to side of the machine forming a reel support a breaker bar and a side extension all arranged in the same vertical plane said extension forming a purchase for said draft appliance.

2. In a stalk chopping machine employing a reel and breaker bar the combination of the main frame extending from side to side of the machine at right angles to the line of draft formed in one piece with the breaker bar and also with the side extension, the sides breaker bar and extension being arranged in the same vertical plane, means for securing a draft appliance to said extension, and means attached to the main frame and draft appliance for equalizing said side draft.

3. In a stalk chopping machine the combination of the reel supporting frame having a side extension in alinement, an outrigger attached to and projected forward of said side extension, a tongue set to one side of said outrigger and an evener for said tongue having depending links at opposite ends and draft attachments connecting one of said links to the driving wheel and the other to the breaker bar.

4. In a stalk chopping machine employing a reel and breaker bar the combination of the main frame having vertical sides connected by a breaker bar forming a continuation of said sides, the driving and caster wheels, castings having journals for said wheels and recesses adapted to span and ride upon said sides provided with L-shaped clamping bolts, and threaded rods mounted on said vertical sides and connected to said castings.

In testimony whereof we affix our signatures, in presence of two witnesses.

ALFRED CANUTESON.
JOHN J. RINGNESS.

Witnesses:
ALF. W. PRICE,
IRA REEDER.